United States Patent [19]

Russell

[11] 4,027,574
[45] June 7, 1977

[54] POT BROACHING MACHINE
[75] Inventor: John Xavier Russell, Troy, Mich.
[73] Assignee: The Babcock & Wilcox Company, New York, N.Y.
[22] Filed: Aug. 28, 1975
[21] Appl. No.: 608,803
[52] U.S. Cl. .................................... 90/10; 90/86
[51] Int. Cl.[2] ................ B23F 9/04; B21D 41/06
[58] Field of Search ..... 90/10, 86, 79, 80, DIG. 24; 198/20 R, 82; 214/95 R, 8.5 F

[56] References Cited
UNITED STATES PATENTS

| | | | |
|---|---|---|---|
| 1,501,317 | 7/1924 | Donaldson | 90/86 |
| 1,905,164 | 4/1933 | Ferris et al. | 90/86 |
| 2,571,904 | 10/1951 | Lofgren | 90/86 X |
| 2,957,569 | 10/1960 | Parke | 198/24 |
| 3,656,401 | 4/1972 | Psenka | 90/10 |
| 3,810,413 | 5/1974 | Kusz et al. | 90/10 |
| 3,847,056 | 11/1974 | Roger | 90/86 X |

FOREIGN PATENTS OR APPLICATIONS 463,730   4/1937   United Kingdom ................... 90/86

Primary Examiner—J. Howard Flint, Jr.
Assistant Examiner—William R. Briggs
Attorney, Agent, or Firm—Vytas R. Matas; Joseph M. Maguire

[57] ABSTRACT

A bottom-loading pot broaching machine has a pot broach vertically mounted on a horizontal face of a base support structure to symmetrically distribute loading forces to the machine. This structure also enables loading and unloading arms to be mounted to the pot broach so as to be mechanically coupled and phased to allow both loading and unloading of the pot broach during a single cycle. A magnetic escapement mechanism is mounted proximately to the unloading arm to magnetically retain a finished workpiece for unloading by the unloading arm.

7 Claims, 4 Drawing Figures

POT BROACHING MACHINE

BACKGROUND OF THE INVENTION

1. Field of the Invention

The present invention generally relates to pot broaching machines and particularly to bottom-loading pot broaching machines having a single mechanism for both loading and unloading the machine.

2. Description of the Prior Art

Machines for broaching the teeth on an external gear as a consequence of a single passage of a work blank through a generally tubular broach are known. The teeth of the broach are located in a pot broach and are usually arranged in longitudinal alignment and are appropriately stepped to perform the required tooth cutting operation. If the gear is a spur gear the teeth are arranged in series extending parallel to the axis of the broach. If the gear is a helical gear the teeth are arranged in helically extending series.

Usually the pot broach is rigidly supported in an elevated position by a goose neck press frame along its vertical axis. Located directly beneath the broach is a piston and cylinder device in which the piston is displaced upwardly during a cutting stroke. A piston rod is connected to the piston and is usually mounted to a work support above the piston which is adapted to receive and carry a gear blank upwardly through the pot broach.

A single passage of the gear blank upwardly through the pot broach results in a complete cutting operation forming the required teeth on the periphery of the gear. The gear is moved upwardly above the upper open end of the broach into a clearance position relative to the broach. It is at this time moved from the work support to a downwardly directed chute.

Automatic means are provided for loading the machine and comprises means for advancing work blanks into a preliminary position directly above the work support. Upward movement of the piston causes the work support to pick up the gear blank and to transport it through the generally tubular broach. Examples of such prior art machines may be seen in U.S. Pat. Nos. 3,656,401 and 3,670,625 and the reader is referred thereto for further details of structure and operation.

The forementioned prior art machines make no provisions for symmetrically mounting the pot broach to a horizontal face of the base structure. As such the stresses from the broaching operation are applied against the vertical mounting support of the press frame and require the support to be extremely rigid and bulky as well as the means used to fasten the pot broach to the mounting surface. Such machines also provide no means for loading and unloading the pot broach with a single mechanical mechanism during one cycle thereof. Separate mechanisms are utilized resulting in more parts and increased machine cost.

Broaching machines are known which mount a broach to a horizontal face of a support structure but these structures are then mounted to a vertical wall or press body. An example of such may be found in U.S. Pat. No. 3,327,589. The side stresses although somewhat alleviated are still not entirely eliminated. Even these machines, however, make no provisions for loading and unloading the broach with a single mechanical mechanism during one cycle thereof.

SUMMARY OF THE INVENTION

The present invention solves the forementioned problems associated with the prior art devices as well as others by providing a bottom-loaded pot broaching machine in which the pot broach is mounted exculsively on a horizontal face of a symmetrically load balanced support base and in which a single mechanical mechanism simultaneously loads and unloads the pot broach during a single cycle.

In a specific embodiment the machine of the present invention has a support base having a horizontal face on which the pot broach is vertically mounted with the inlet side of the pot broach being affixed to the horizontal face of the support base. This mounting yields a symmetrical loading around the center line of the work and tool axis and provides more rigidity than the usual vertical surface mounted pot broaches. The machine also has a pivotable unloading arm at the outlet of the machine. The loading and unloading arms are phasedly mounted at opposite ends of a rotatable shaft. When the shaft is turned the loading arm feeds and unfinished workpiece into the inlet. The workpiece is then drawn through the pot broach and the loading is reset. While the loading arm is being reset, the unloading arm simultaneously withdraws the finished workpiece from the outlet area of the pot broach. Thus during one cylce of this single mechanical mechanism the workpiece is loaded to and unloaded from the pot broach.

From the foregoing it will be seen that one aspect of the present invention is to provide a symmetrically load balanced bottom-loaded pot broach machine.

Another aspect of the present invention is to provide a pot broaching machine having a mechanism which will insert an unfinished workpiece into the machine and remove a finished workpiece therefrom during one cycle of the mechanism.

Another aspect of the present invention is to provide a pot broaching machine having a magnetic escapement mechanism for retaining a finished workpiece proximately to the unloading arm of the machine.

These and other aspects of the present invention will be more fully understood after a review of the following description of the preferred embodiments and the drawings.

DESCRIPTION OF THE PREFERRED EMBODIMENT

Figure 1:
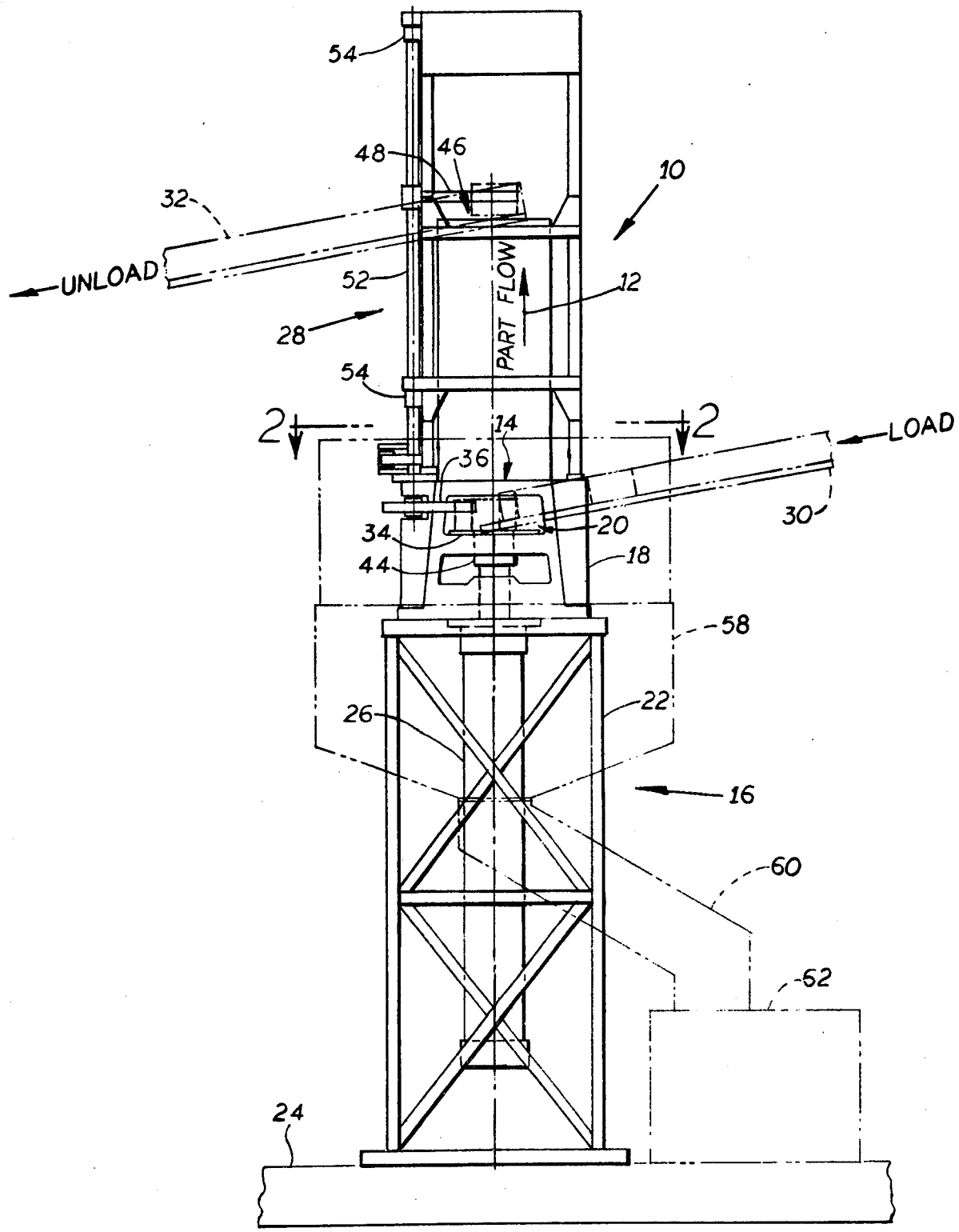
FIG. 1 is a side view of the present pot broach machine.

Referring now to the drawings, FIG. 1 discloses a pot broaching machine 10 which has a known pot broach 12 vertically mounted along its horizontal base 14 to a support structure 16.

The support structure 16 has a pot mounting base assembly 18 to which the pot broach 12 is rigidly affixed by well known means such as nuts and bolts. The base assembly 18 also has at least one open side 20 through which workpieces are inserted for drawing through the pot broach 12. The base 18 is mounted to a frame 22 which is affixed to a floor 24 and which supports a known piston and cylinder device 26 in which a piston (not shown) is vertically movable to push the workpiece through the pot broach 12. This vertical mounting of the pot broach 12 along a horizontal end to the support structure 16 provides a symmetrical loading around the center line of the machine 10 yielding added rigidity to the entire structure.

The machine 10 is set up to load unfinished workpieces to one end of the pot broach 12 and unload a finished workpiece from the opposite end of the pot broach 12. To accomplish this a work transfer mechanism 28 is provided which operates between a loading chute 30 and an unloading chute 32. The unfinished workpieces are moved along the chute 30 to a platform 34 located in the base assembly 18 whereon they are placed in position for loading by the transfer mechanism 28.

Figure 2:
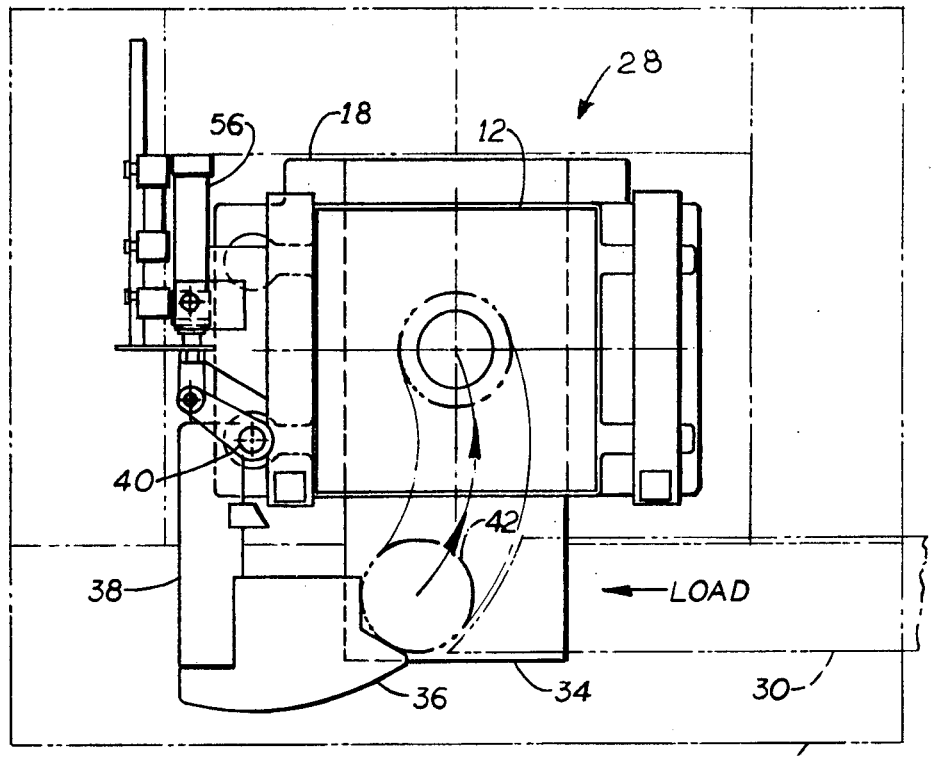
FIG. 2 is a sectional view of the machine of FIG. 1 taken along section 2—2.

As may be seen with particular reference to FIGS. 1 and 2, the transfer mechanism 28 has a loading pusher 36 connected to an arm 38 which rotates about a pivot 40 to move an unfinished workpiece 42 onto a pusher 44 connected to the piston and cylinder 26. Once the placement of the workpiece 42 on the pusher 44 is detected by any known detecting means the piston and cylinder 26 are actuated and the workpiece is pushed through the pot broach 12. When the workpiece is detected by the same known detector means as having been pushed through the pot broach 12 and emerges from an outlet 46 the movement of the piston assembly 26 is ceased and the transfer mechanism 28 is also actuated to swing the finished workpiece onto the chute 32 where it slides under the force of gravity to a collecting bin (not shown).

Figure 3:
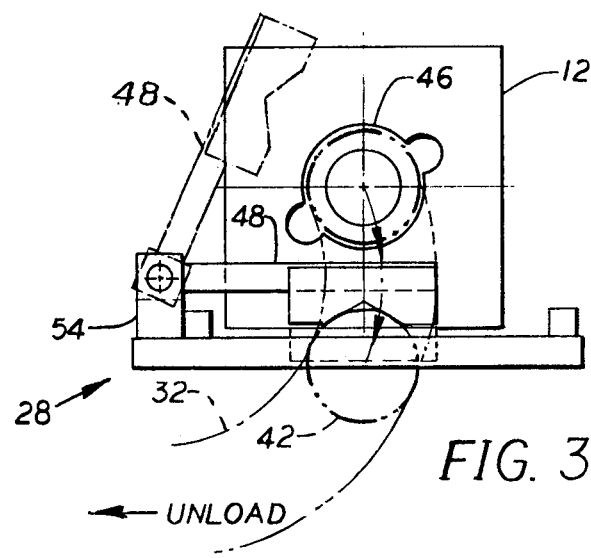
FIG. 3 is a top view of the machine of FIG. 1.

As is best seen in FIG. 3 the finished workpiece 42 is moved into the chute 32 by an unloading arm 48 which is rotated between a first position, shown in phantom lines and a second position shown in solid lines.

The loading arm 36, 38 and the unloading arm 48 are both mounted to rotate simultaneously with a shaft 52 which is supported by bearings 54 mounted to the pot broach 12. A piston assembly 56 is extended to push the loading arm 36, 38 causing it to rotate and consequently to also rotate the shaft 52 and the unloading arm 48 connected thereto. The loading and unloading arms 36, 38 and 48 are phasedly mounted to the shaft 52 so that when the loading arm 36, 38 has placed the workpiece on pusher 44 the unloading arm 48 is in the phantom position and stands ready to swing the finished workpiece unto the chute 32. When the finished part 42 is detected at the outlet 46 the piston 56 is retracted and the loading arm 36, 38 is reset to its FIG. 2 position simultaneously with a resetting of the unloading arm 48 to its solid line FIG. 3 position. This action allows a simultaneous resetting of one arm while the other arm is pushing a workpiece to provide both a loading and unloading of the machine 10 during one cycle of the work transfer mechanism 28.

Figure 4:
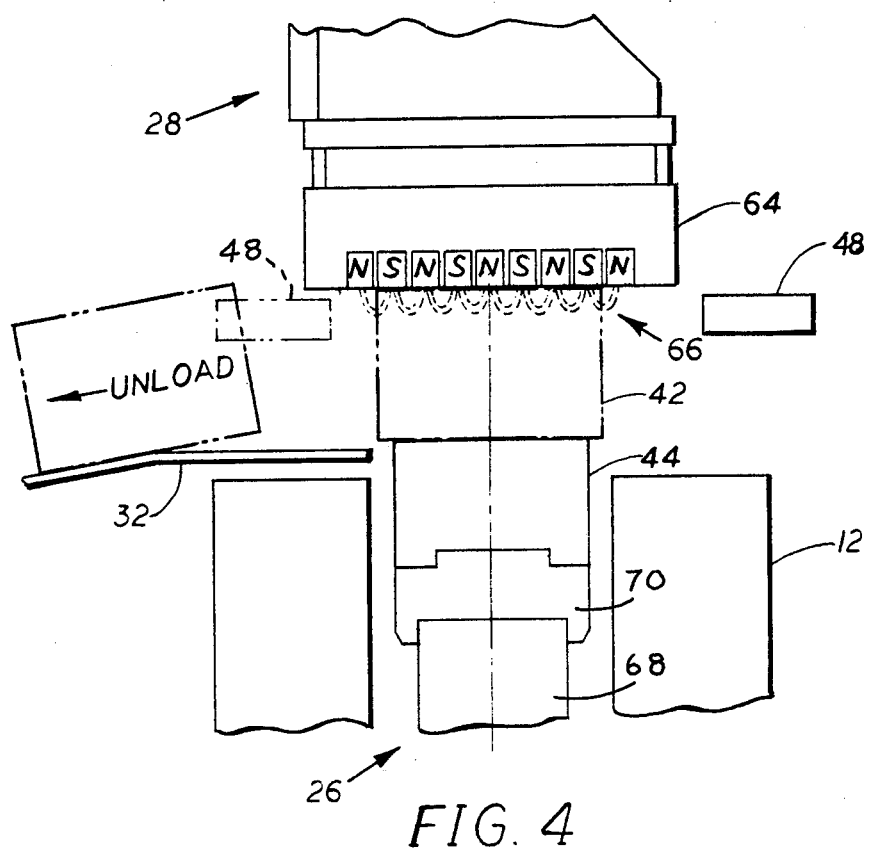
FIG. 4 is a side view of a magnetic escapement mountable to the pot broach machine of FIG. 1.

As may be seen with reference to FIG. 4, a magnetic escapement member 64 may be mounted at the top of the pot broach 12 to retain the finished workpiece 42 within a magnetic field 66 and prevent it from dropping back down into the pot broach 12 when the piston assembly 26 is retracted. Clearly the workpiece 42 must be formed from a magnetically susceptible material such as iron.

To prevent the magnetization of the pot broach 12 the unloading arm 48 and unloading pusher 68 are made from non-magnetic material. Maximum magnetic holding power is provided by the escapement 64 by closely spacing NORTH and SOUTH magnetic poles on the face of the escapement 64 facing the pot broach 12.

Since the broaching operation requires liquid cooling and results in the formation of metal chips, a liquid and chip collector 58 is sealably mounted around the machine 10. The collector 58 directs the metal chips and cooling liquid along an outlet 60 to a reservoir 62 where the chips are filtered from the coolant and the coolant is recycled back to the machine 10.

Certain modifications and improvements will occur to those skilled in the art after reading the foregoing specification. It will be understood that such additions and modifications were deleted herein for the sake of conciseness and readability but are properly within the scope of the appended claims.

I claim:
1. A pot broaching machine having an integrated workpiece transfer mechanism comprising:
   a mounting member;
   a pot broach mounted to said mounting member and having a rough workpiece inlet at one end and a finished workpiece outlet at an opposite end;
   a rough workpiece loading arm mounted proximately to the inlet of said pot broach operative to move a rough workpiece to a position aligning the rough workpieces with the inlet of said pot broach;
   means operative to transfer the rough workpiece through said pot broach to produce a finished workpiece at the outlet of said pot broach;
   a finished workpiece unloading arm mounted proximately to the outlet of said pot broach operative to move the finished workpiece away from the outlet of said pot broach; and
   means operative to mechanically link said loading arm to said unloading arm to allow said unloading arm to move the finished workpiece away from the outlet of said pot broach whenever said loading arm moves a rough workpiece to the inlet of said pot broach.
2. A pot broaching machine as set forth in claim 1 wherein said mounting member includes a rigid base structure for mounting the rough workpiece inlet end of said pot broach thereto to provide symmetrical force loading of the machine.
3. A pot broaching machine as set forth in claim 2 wherein said linking means includes a shaft extending along the length of said pot broach to connect said loading arm to said unloading arm.
4. A pot broaching machine as set forth in claim 3 wherein said pot broach includes a bearing member having bearing surface thereon for mounting said shaft therethrough.
5. A pot broaching machine as set forth in claim 4 wherein said loading arm is mounted to one end of said shaft at a first angle and said unloading arm is mounted to the other end of said shaft at a second angle phasedly located from said first angle to allow said loading arm to move a rough workpiece to the inlet of the pot broach while said unloading arm moves said finished workpiece away from the outlet of said pot broach.
6. A pot broaching machine as set forth in claim 5 including means operative said loading arm.
7. A bottom-loading pot broaching machine comprising:

a pot broach having an inlet end for inserting a rough workpiece therein and an outlet end for extracting a finished workpiece therefrom;

a base structure for symmetrically supporting said pot broach thereon along a horizontal surface, the inlet end of said pot broach being rigidly affixed to said base structure;

means, mounted to said base structure, operative to push said rough workpiece through pot broach; and mechanical mean operative to transfer a rough workpiece into the area of the inlet end of said pot broach and to transfer a finished workpiece away from the outlet of said pot broach including, a loading arm pivotably mounted at the inlet of said pot broach, an unloading arm pivotably mounted at the outlet of said pot broach, a connecting member having said loading and unloading arms phasedly mounted at opposite ends thereof, and means operative to rotate said connecting member to move said loading arm from a first position engaging said rough workpiece to a second position aligning said rough workpiece with the inlet of said pot broach while moving said unloading to move said finished workpiece away from the outlet of said pot broach.

* * * * *